(12) United States Patent
Bloch et al.

(10) Patent No.: US 11,490,047 B2
(45) Date of Patent: Nov. 1, 2022

(54) SYSTEMS AND METHODS FOR DYNAMICALLY ADJUSTING VIDEO ASPECT RATIOS

(71) Applicant: JBF Interlude 2009 LTD, Tel Aviv-Jaffa (IL)

(72) Inventors: Jonathan Bloch, Brooklyn, NY (US); Barak Feldman, Tenafly, NJ (US); Tal Zubalsky, Brooklyn, NY (US); Yuval Hofshy, Kfar Saba (IL); Tomer Lahav, Brooklyn, NY (US)

(73) Assignee: JBF Interlude 2009 LTD, Tel Aviv (IL)

( * ) Notice: Subject to any disclaimer, the term of this patent is extended or adjusted under 35 U.S.C. 154(b) by 0 days.

(21) Appl. No.: 16/591,103

(22) Filed: Oct. 2, 2019

(65) Prior Publication Data
US 2021/0105433 A1    Apr. 8, 2021

(51) Int. Cl.
*H04N 7/01* (2006.01)
*G06F 3/04812* (2022.01)

(52) U.S. Cl.
CPC ....... *H04N 7/0122* (2013.01); *G06F 3/04812* (2013.01); *H04N 7/0115* (2013.01)

(58) Field of Classification Search
CPC . H04N 7/0122; H04N 7/0115; G06F 3/04812
USPC ...................................................... 348/445
See application file for complete search history.

(56) References Cited

U.S. PATENT DOCUMENTS

| | | | |
|---|---|---|---|
| 4,569,026 | A | 2/1986 | Best |
| 5,137,277 | A | 8/1992 | Kitaue |
| 5,161,034 | A | 11/1992 | Klappert |
| 5,568,602 | A | 10/1996 | Callahan et al. |
| 5,568,603 | A | 10/1996 | Chen et al. |

(Continued)

FOREIGN PATENT DOCUMENTS

| | | |
|---|---|---|
| CA | 2639491 A1 | 3/2010 |
| DE | 2428329 A1 | 1/1975 |

(Continued)

OTHER PUBLICATIONS

U.S. Appl. No. 12/706,721 U.S. Pat. No. 9,190,110 Published as US2010/0293455, System and Method for Assembling a Recorded Composition, filed Feb. 17, 2010.

(Continued)

*Primary Examiner* — Brian P Yenke
*Assistant Examiner* — Omer Khalid
(74) *Attorney, Agent, or Firm* — Goodwin Procter LLP

(57) ABSTRACT

Described herein are systems and methods for dynamically adjusting an aspect ratio of a video. Exemplary methods can include receiving (i) a video having an original aspect ratio and at least one user interface (UI) element configured to be selected by a user of the video and (ii) an aspect ratio of a display screen for presenting the video. The methods can include automatically determining a display area of the video to be presented based on (i) the default position of the at least one UI element in the video, (ii) an active area in the video, and/or (iii) a central area in the video, the display area having an aspect ratio equal to the aspect ratio of the display screen; and presenting the video display area in the display screen with the at least one UI element for at least the portion of the video.

20 Claims, 10 Drawing Sheets

(56) References Cited

U.S. PATENT DOCUMENTS

| | | | |
|---|---|---|---|
| 5,597,312 A | 1/1997 | Bloom et al. |
| 5,607,356 A | 3/1997 | Schwartz |
| 5,610,653 A | 3/1997 | Abecassis |
| 5,636,036 A | 6/1997 | Ashbey |
| 5,676,551 A | 10/1997 | Knight et al. |
| 5,715,169 A | 2/1998 | Noguchi |
| 5,734,862 A | 3/1998 | Kulas |
| 5,737,527 A | 4/1998 | Shiels et al. |
| 5,745,738 A | 4/1998 | Ricard |
| 5,751,953 A | 5/1998 | Shiels et al. |
| 5,754,770 A | 5/1998 | Shiels et al. |
| 5,818,435 A | 10/1998 | Kozuka et al. |
| 5,848,934 A | 12/1998 | Shiels et al. |
| 5,887,110 A | 3/1999 | Sakamoto et al. |
| 5,894,320 A | 4/1999 | Vancelette |
| 5,956,037 A | 9/1999 | Osawa et al. |
| 5,983,190 A | 11/1999 | Trower, II et al. |
| 6,067,400 A | 5/2000 | Saeki et al. |
| 6,122,668 A | 9/2000 | Teng et al. |
| 6,128,712 A | 10/2000 | Hunt et al. |
| 6,191,780 B1 | 2/2001 | Martin et al. |
| 6,222,925 B1 | 4/2001 | Shiels et al. |
| 6,240,555 B1 | 5/2001 | Shoff et al. |
| 6,298,020 B1 | 10/2001 | Kumagami |
| 6,298,482 B1 | 10/2001 | Seidman et al. |
| 6,460,036 B1 | 10/2002 | Herz |
| 6,535,639 B1 | 3/2003 | Uchihachi et al. |
| 6,657,906 B2 | 12/2003 | Martin |
| 6,698,020 B1 | 2/2004 | Zigmond et al. |
| 6,728,477 B1 | 4/2004 | Watkins |
| 6,771,875 B1 | 8/2004 | Kunieda et al. |
| 6,801,947 B1 | 10/2004 | Li |
| 6,947,966 B1 | 9/2005 | Oko, Jr. et al. |
| 7,085,844 B2 | 8/2006 | Thompson |
| 7,155,676 B2 | 12/2006 | Land et al. |
| 7,231,132 B1 | 6/2007 | Davenport |
| 7,296,231 B2 | 11/2007 | Loui et al. |
| 7,310,784 B1 | 12/2007 | Gottlieb et al. |
| 7,379,653 B2 | 5/2008 | Yap et al. |
| 7,430,360 B2 | 9/2008 | Abecassis |
| 7,444,069 B1 | 10/2008 | Bernsley |
| 7,472,910 B1 | 1/2009 | Okada et al. |
| 7,627,605 B1 | 12/2009 | Lamere et al. |
| 7,669,128 B2 | 2/2010 | Bailey et al. |
| 7,694,320 B1 | 4/2010 | Yeo et al. |
| 7,779,438 B2 | 8/2010 | Davies |
| 7,787,973 B2 | 8/2010 | Lambert |
| 7,917,505 B2 | 3/2011 | van Gent et al. |
| 8,024,762 B2 | 9/2011 | Britt |
| 8,046,801 B2 | 10/2011 | Ellis et al. |
| 8,065,710 B2 | 11/2011 | Malik |
| 8,151,139 B1 | 4/2012 | Gordon |
| 8,176,425 B2 | 5/2012 | Wallace et al. |
| 8,190,001 B2 | 5/2012 | Bernsley |
| 8,202,167 B2 | 6/2012 | Ackley et al. |
| 8,276,058 B2 | 9/2012 | Gottlieb et al. |
| 8,281,355 B1 | 10/2012 | Weaver et al. |
| 8,321,905 B1 | 11/2012 | Streeter et al. |
| 8,350,908 B2 | 1/2013 | Morris et al. |
| 8,405,706 B2 * | 3/2013 | Zhang | H04N 21/44218 348/14.07 |
| 8,600,220 B2 | 12/2013 | Bloch et al. |
| 8,612,517 B1 | 12/2013 | Yadid et al. |
| 8,626,337 B2 | 1/2014 | Corak et al. |
| 8,646,020 B2 | 2/2014 | Reisman |
| 8,650,489 B1 | 2/2014 | Baum et al. |
| 8,667,395 B2 | 3/2014 | Hosogai et al. |
| 8,750,682 B1 | 6/2014 | Nicksay et al. |
| 8,752,087 B2 | 6/2014 | Begeja et al. |
| 8,826,337 B2 | 9/2014 | Issa et al. |
| 8,860,882 B2 | 10/2014 | Bloch et al. |
| 8,930,975 B2 | 1/2015 | Woods et al. |
| 8,977,113 B1 | 3/2015 | Rumteen et al. |
| 9,009,619 B2 | 4/2015 | Bloch et al. |
| 9,021,537 B2 | 4/2015 | Funge et al. |
| 9,082,092 B1 | 7/2015 | Henry |
| 9,094,718 B2 | 7/2015 | Barton et al. |
| 9,190,110 B2 | 11/2015 | Bloch |
| 9,257,148 B2 | 2/2016 | Bloch et al. |
| 9,268,774 B2 | 2/2016 | Kim et al. |
| 9,271,015 B2 | 2/2016 | Bloch et al. |
| 9,363,464 B2 | 6/2016 | Alexander |
| 9,367,196 B1 | 6/2016 | Goldstein et al. |
| 9,374,411 B1 | 6/2016 | Goetz |
| 9,390,099 B1 | 7/2016 | Wang et al. |
| 9,456,247 B1 | 9/2016 | Pontual et al. |
| 9,465,435 B1 | 10/2016 | Zhang et al. |
| 9,473,582 B1 | 10/2016 | Fraccaroli |
| 9,510,044 B1 | 11/2016 | Pereira et al. |
| 9,520,155 B2 | 12/2016 | Bloch et al. |
| 9,530,454 B2 | 12/2016 | Bloch et al. |
| 9,538,219 B2 | 1/2017 | Sakata et al. |
| 9,554,061 B1 | 1/2017 | Proctor, Jr. et al. |
| 9,571,877 B2 | 2/2017 | Lee et al. |
| 9,607,655 B2 | 3/2017 | Bloch et al. |
| 9,641,898 B2 | 5/2017 | Bloch et al. |
| 9,653,115 B2 | 5/2017 | Bloch et al. |
| 9,653,116 B2 | 5/2017 | Paulraj et al. |
| 9,672,868 B2 | 6/2017 | Bloch et al. |
| 9,715,901 B1 | 7/2017 | Singh et al. |
| 9,736,503 B1 | 8/2017 | Bakshi et al. |
| 9,792,026 B2 | 10/2017 | Bloch et al. |
| 9,792,957 B2 | 10/2017 | Bloch et al. |
| 9,826,285 B1 | 11/2017 | Mishra et al. |
| 9,967,621 B2 | 5/2018 | Armstrong et al. |
| 10,070,192 B2 | 9/2018 | Baratz |
| 10,178,304 B1 | 1/2019 | Tudor et al. |
| 10,178,421 B2 | 1/2019 | Thomas et al. |
| 10,187,687 B2 | 1/2019 | Harb et al. |
| 10,194,189 B1 | 1/2019 | Goetz et al. |
| 10,257,572 B2 | 4/2019 | Manus et al. |
| 10,419,790 B2 | 9/2019 | Gersten |
| 10,460,765 B2 | 10/2019 | Bloch et al. |
| 10,523,982 B2 | 12/2019 | Oyman |
| 10,771,824 B1 | 9/2020 | Haritaoglu et al. |
| 2001/0056427 A1 | 12/2001 | Yoon et al. |
| 2002/0019799 A1 | 2/2002 | Ginsberg et al. |
| 2002/0029218 A1 | 3/2002 | Bentley et al. |
| 2002/0053089 A1 | 5/2002 | Massey |
| 2002/0086724 A1 | 7/2002 | Miyaki et al. |
| 2002/0089523 A1 * | 7/2002 | Hodgkinson | H04N 21/440272 348/E5.111 |
| 2002/0091455 A1 | 7/2002 | Williams |
| 2002/0105535 A1 | 8/2002 | Wallace et al. |
| 2002/0106191 A1 | 8/2002 | Betz et al. |
| 2002/0120456 A1 | 8/2002 | Berg et al. |
| 2002/0120931 A1 | 8/2002 | Huber et al. |
| 2002/0124250 A1 | 9/2002 | Proehl et al. |
| 2002/0129374 A1 | 9/2002 | Freeman et al. |
| 2002/0140719 A1 | 10/2002 | Amir et al. |
| 2002/0144262 A1 | 10/2002 | Plotnick et al. |
| 2002/0174430 A1 | 11/2002 | Ellis et al. |
| 2002/0177914 A1 | 11/2002 | Chase |
| 2002/0194595 A1 | 12/2002 | Miller et al. |
| 2003/0007560 A1 | 1/2003 | Mayhew et al. |
| 2003/0012409 A1 | 1/2003 | Overton et al. |
| 2003/0020744 A1 | 1/2003 | Ellis et al. |
| 2003/0023757 A1 | 1/2003 | Ishioka et al. |
| 2003/0039471 A1 | 2/2003 | Hashimoto |
| 2003/0069057 A1 | 4/2003 | Defrees-Parrott |
| 2003/0076347 A1 | 4/2003 | Barrett et al. |
| 2003/0101164 A1 | 5/2003 | Pic et al. |
| 2003/0148806 A1 | 8/2003 | Weiss |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0009813 A1 | 1/2004 | Wind |
| 2004/0019905 A1 | 1/2004 | Fellenstein et al. |
| 2004/0034711 A1 | 2/2004 | Hughes |
| 2004/0070595 A1 | 4/2004 | Atlas et al. |
| 2004/0091848 A1 | 5/2004 | Nemitz |
| 2004/0125124 A1 | 7/2004 | Kim et al. |
| 2004/0128317 A1 | 7/2004 | Sull et al. |

(56) References Cited

U.S. PATENT DOCUMENTS

| | | |
|---|---|---|
| 2004/0138948 A1 | 7/2004 | Loomis |
| 2004/0146275 A1 | 7/2004 | Takata et al. |
| 2004/0172476 A1 | 9/2004 | Chapweske |
| 2004/0194128 A1 | 9/2004 | McIntyre et al. |
| 2004/0194131 A1 | 9/2004 | Ellis et al. |
| 2004/0199923 A1 | 10/2004 | Russek |
| 2004/0261127 A1 | 12/2004 | Freeman et al. |
| 2005/0019015 A1 | 1/2005 | Ackley et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0107159 A1 | 5/2005 | Sato |
| 2005/0120389 A1 | 6/2005 | Boss et al. |
| 2005/0132401 A1 | 6/2005 | Boccon-Gibod et al. |
| 2005/0166224 A1 | 7/2005 | Ficco |
| 2005/0198661 A1 | 9/2005 | Collins et al. |
| 2005/0210145 A1 | 9/2005 | Kim et al. |
| 2005/0251820 A1 | 11/2005 | Stefanik et al. |
| 2005/0251827 A1 | 11/2005 | Ellis et al. |
| 2006/0002895 A1 | 1/2006 | McDonnell et al. |
| 2006/0024034 A1 | 2/2006 | Filo et al. |
| 2006/0028951 A1 | 2/2006 | Tozun et al. |
| 2006/0064733 A1 | 3/2006 | Norton et al. |
| 2006/0080167 A1 | 4/2006 | Chen et al. |
| 2006/0120624 A1 | 6/2006 | Jojic et al. |
| 2006/0150072 A1 | 7/2006 | Salvucci |
| 2006/0150216 A1 | 7/2006 | Herz et al. |
| 2006/0153537 A1 | 7/2006 | Kaneko et al. |
| 2006/0155400 A1 | 7/2006 | Loomis |
| 2006/0200842 A1 | 9/2006 | Chapman et al. |
| 2006/0222322 A1 | 10/2006 | Levitan |
| 2006/0224260 A1 | 10/2006 | Hicken et al. |
| 2006/0274828 A1 | 12/2006 | Siemens et al. |
| 2007/0003149 A1 | 1/2007 | Nagumo et al. |
| 2007/0024706 A1 | 2/2007 | Brannon et al. |
| 2007/0033633 A1 | 2/2007 | Andrews et al. |
| 2007/0055989 A1 | 3/2007 | Shanks et al. |
| 2007/0079325 A1 | 4/2007 | de Heer |
| 2007/0085759 A1 | 4/2007 | Lee et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0154169 A1 | 7/2007 | Cordray et al. |
| 2007/0157234 A1 | 7/2007 | Walker |
| 2007/0157260 A1 | 7/2007 | Walker |
| 2007/0157261 A1 | 7/2007 | Steelberg et al. |
| 2007/0162395 A1 | 7/2007 | Ben-Yaacov et al. |
| 2007/0220583 A1 | 9/2007 | Bailey et al. |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0019445 A1 | 1/2008 | Aono et al. |
| 2008/0021187 A1 | 1/2008 | Wescott et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0148152 A1 | 6/2008 | Blinnikka et al. |
| 2008/0161111 A1 | 7/2008 | Schuman |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0029771 A1 | 1/2009 | Donahue |
| 2009/0055880 A1 | 2/2009 | Batteram et al. |
| 2009/0063681 A1 | 3/2009 | Ramakrishnan et al. |
| 2009/0063995 A1 | 3/2009 | Baron et al. |
| 2009/0077137 A1 | 3/2009 | Weda et al. |
| 2009/0079663 A1 | 3/2009 | Chang et al. |
| 2009/0083631 A1 | 3/2009 | Sidi et al. |
| 2009/0116817 A1 | 5/2009 | Kim et al. |
| 2009/0177538 A1 | 7/2009 | Brewer et al. |
| 2009/0178089 A1 | 7/2009 | Picco et al. |
| 2009/0191971 A1 | 7/2009 | Avent |
| 2009/0195652 A1 | 8/2009 | Gal |
| 2009/0199697 A1 | 8/2009 | Lehtiniemi et al. |
| 2009/0226046 A1 | 9/2009 | Shteyn |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265737 A1 | 10/2009 | Issa et al. |
| 2009/0265746 A1 | 10/2009 | Halen et al. |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0050083 A1 | 2/2010 | Axen et al. |
| 2010/0069159 A1 | 3/2010 | Yamada et al. |
| 2010/0070987 A1 | 3/2010 | Amento et al. |
| 2010/0077290 A1 | 3/2010 | Pueyo |
| 2010/0088726 A1 | 4/2010 | Curtis et al. |
| 2010/0122286 A1 | 5/2010 | Begeja et al. |
| 2010/0146145 A1 | 6/2010 | Tippin et al. |
| 2010/0153512 A1 | 6/2010 | Balassanian et al. |
| 2010/0153885 A1 | 6/2010 | Yates |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0199299 A1 | 8/2010 | Chang et al. |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293455 A1 | 11/2010 | Bloch |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0069940 A1 | 3/2011 | Shimy et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0182366 A1 | 7/2011 | Frojdh et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0239246 A1 | 9/2011 | Woodward et al. |
| 2011/0246661 A1 | 10/2011 | Manzari et al. |
| 2011/0246885 A1 | 10/2011 | Pantos et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |

(56) References Cited

U.S. PATENT DOCUMENTS

| | | |
|---|---|---|
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0011438 A1* | 1/2012 | Kim .................. G06F 1/169 345/173 |
| 2012/0017141 A1 | 1/2012 | Eelen et al. |
| 2012/0062576 A1 | 3/2012 | Rosenthal et al. |
| 2012/0081389 A1 | 4/2012 | Dilts |
| 2012/0089911 A1 | 4/2012 | Hosking et al. |
| 2012/0094768 A1 | 4/2012 | McCaddon et al. |
| 2012/0105723 A1 | 5/2012 | van Coppenolle et al. |
| 2012/0110618 A1 | 5/2012 | Kilar et al. |
| 2012/0110620 A1 | 5/2012 | Kilar et al. |
| 2012/0120114 A1 | 5/2012 | You et al. |
| 2012/0134646 A1 | 5/2012 | Alexander |
| 2012/0137015 A1 | 5/2012 | Sun |
| 2012/0147954 A1 | 6/2012 | Kasai et al. |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0213495 A1 | 8/2012 | Hafeneger et al. |
| 2012/0225693 A1 | 9/2012 | Sirpal et al. |
| 2012/0233631 A1 | 9/2012 | Geshwind |
| 2012/0246032 A1 | 9/2012 | Beroukhim et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0021269 A1* | 1/2013 | Johnson ............. G06F 3/03547 345/173 |
| 2013/0024888 A1 | 1/2013 | Sivertsen |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0033542 A1 | 2/2013 | Nakazawa |
| 2013/0036200 A1 | 2/2013 | Roberts et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0094830 A1 | 4/2013 | Stone et al. |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0173765 A1 | 7/2013 | Korbecki |
| 2013/0177294 A1 | 7/2013 | Kennberg |
| 2013/0188923 A1 | 7/2013 | Hartley et al. |
| 2013/0202265 A1 | 8/2013 | Arrasvuori et al. |
| 2013/0204710 A1 | 8/2013 | Boland et al. |
| 2013/0219425 A1 | 8/2013 | Swartz |
| 2013/0235152 A1 | 9/2013 | Hannuksela et al. |
| 2013/0235270 A1 | 9/2013 | Sasaki et al. |
| 2013/0254292 A1 | 9/2013 | Bradley |
| 2013/0259442 A1 | 10/2013 | Bloch et al. |
| 2013/0282917 A1 | 10/2013 | Reznik et al. |
| 2013/0290818 A1 | 10/2013 | Arrasvuori et al. |
| 2013/0298146 A1 | 11/2013 | Conrad et al. |
| 2013/0308926 A1 | 11/2013 | Jang et al. |
| 2013/0328888 A1 | 12/2013 | Beaver et al. |
| 2013/0330055 A1 | 12/2013 | Zimmermann et al. |
| 2013/0335427 A1 | 12/2013 | Cheung et al. |
| 2014/0015940 A1 | 1/2014 | Yoshida |
| 2014/0019865 A1 | 1/2014 | Shah |
| 2014/0025620 A1 | 1/2014 | Greenzeiger et al. |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0105420 A1 | 4/2014 | Lee |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0152564 A1 | 6/2014 | Gulezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0210860 A1 | 7/2014 | Caissy |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1 | 9/2014 | Needham et al. |
| 2014/0298173 A1 | 10/2014 | Rock |
| 2014/0314239 A1 | 10/2014 | Meyer et al. |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0020086 A1 | 1/2015 | Chen et al. |
| 2015/0033266 A1 | 1/2015 | Klappert et al. |
| 2015/0046946 A1 | 2/2015 | Hassell et al. |
| 2015/0058342 A1 | 2/2015 | Kim et al. |
| 2015/0063781 A1 | 3/2015 | Silverman et al. |
| 2015/0067596 A1* | 3/2015 | Brown .................. G06F 3/0481 715/808 |
| 2015/0067723 A1 | 3/2015 | Bloch et al. |
| 2015/0070458 A1 | 3/2015 | Kim et al. |
| 2015/0104155 A1 | 4/2015 | Bloch et al. |
| 2015/0106845 A1 | 4/2015 | Popkiewicz et al. |
| 2015/0124171 A1 | 5/2015 | King |
| 2015/0154439 A1 | 6/2015 | Anzue et al. |
| 2015/0160853 A1 | 6/2015 | Hwang et al. |
| 2015/0179224 A1 | 6/2015 | Bloch et al. |
| 2015/0181271 A1 | 6/2015 | Onno et al. |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0256861 A1 | 9/2015 | Oyman |
| 2015/0258454 A1 | 9/2015 | King et al. |
| 2015/0278986 A1* | 10/2015 | Edwin .................. G06T 11/60 345/428 |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0318018 A1 | 11/2015 | Kaiser et al. |
| 2015/0331485 A1 | 11/2015 | Wilairat et al. |
| 2015/0331933 A1 | 11/2015 | Tocchini, IV et al. |
| 2015/0331942 A1 | 11/2015 | Tan |
| 2015/0348325 A1 | 12/2015 | Voss |
| 2016/0009487 A1 | 1/2016 | Edwards et al. |
| 2016/0021412 A1 | 1/2016 | Zito, Jr. |
| 2016/0037217 A1 | 2/2016 | Harmon et al. |
| 2016/0057497 A1 | 2/2016 | Kim et al. |
| 2016/0062540 A1 | 3/2016 | Yang et al. |
| 2016/0065831 A1 | 3/2016 | Howard et al. |
| 2016/0066051 A1 | 3/2016 | Caidar et al. |
| 2016/0086585 A1* | 3/2016 | Sugimoto .................. G06F 3/14 345/668 |
| 2016/0094875 A1 | 3/2016 | Peterson et al. |
| 2016/0099024 A1 | 4/2016 | Gilley |
| 2016/0100226 A1 | 4/2016 | Sadler et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0142889 A1 | 5/2016 | O'Connor et al. |

(56) References Cited

U.S. PATENT DOCUMENTS

| | | | |
|---|---|---|---|
| 2016/0162179 A1 | 6/2016 | Annett et al. | |
| 2016/0170948 A1 | 6/2016 | Bloch | |
| 2016/0173944 A1 | 6/2016 | Kilar et al. | |
| 2016/0192009 A1 | 6/2016 | Sugio et al. | |
| 2016/0217829 A1 | 7/2016 | Bloch et al. | |
| 2016/0224573 A1 | 8/2016 | Shahraray et al. | |
| 2016/0232579 A1 | 8/2016 | Fahnestock | |
| 2016/0277779 A1 | 9/2016 | Zhang et al. | |
| 2016/0303608 A1 | 10/2016 | Jossick | |
| 2016/0321689 A1 | 11/2016 | Turgeman | |
| 2016/0322054 A1 | 11/2016 | Bloch et al. | |
| 2016/0323608 A1 | 11/2016 | Bloch et al. | |
| 2016/0337691 A1 | 11/2016 | Prasad et al. | |
| 2016/0365117 A1 | 12/2016 | Boliek et al. | |
| 2016/0366454 A1 | 12/2016 | Tatourian et al. | |
| 2017/0006322 A1 | 1/2017 | Dury et al. | |
| 2017/0041372 A1 | 2/2017 | Hosur | |
| 2017/0062012 A1* | 3/2017 | Bloch | G11B 27/34 |
| 2017/0142486 A1 | 5/2017 | Masuda | |
| 2017/0178409 A1 | 6/2017 | Bloch et al. | |
| 2017/0178601 A1 | 6/2017 | Bloch et al. | |
| 2017/0195736 A1 | 7/2017 | Chai et al. | |
| 2017/0264920 A1 | 9/2017 | Mickelsen | |
| 2017/0286424 A1 | 10/2017 | Peterson | |
| 2017/0289220 A1 | 10/2017 | Bloch et al. | |
| 2017/0295410 A1 | 10/2017 | Bloch et al. | |
| 2017/0326462 A1 | 11/2017 | Lyons et al. | |
| 2017/0337196 A1 | 11/2017 | Goela et al. | |
| 2017/0345460 A1 | 11/2017 | Bloch et al. | |
| 2018/0007443 A1 | 1/2018 | Cannistraro et al. | |
| 2018/0014049 A1 | 1/2018 | Griffin et al. | |
| 2018/0025078 A1 | 1/2018 | Quennesson | |
| 2018/0048831 A1 | 2/2018 | Berwick et al. | |
| 2018/0068019 A1 | 3/2018 | Novikoff et al. | |
| 2018/0115592 A1 | 4/2018 | Samineni | |
| 2018/0130501 A1 | 5/2018 | Bloch et al. | |
| 2018/0176573 A1 | 6/2018 | Chawla et al. | |
| 2018/0191574 A1 | 7/2018 | Vishnia et al. | |
| 2018/0254067 A1 | 9/2018 | Elder | |
| 2018/0262798 A1 | 9/2018 | Ramachandra | |
| 2018/0314959 A1 | 11/2018 | Apokatanidis et al. | |
| 2019/0075367 A1 | 3/2019 | van Zessen et al. | |
| 2019/0090002 A1 | 3/2019 | Ramadorai et al. | |
| 2019/0098371 A1 | 3/2019 | Keesan | |
| 2019/0132639 A1 | 5/2019 | Panchaksharaiah et al. | |
| 2019/0166412 A1 | 5/2019 | Panchaksharaiah et al. | |
| 2019/0182525 A1 | 6/2019 | Steinberg et al. | |
| 2019/0238719 A1 | 8/2019 | Alameh et al. | |
| 2019/0335225 A1 | 10/2019 | Fang et al. | |
| 2019/0354936 A1 | 11/2019 | Deluca et al. | |
| 2020/0037047 A1 | 1/2020 | Cheung et al. | |

FOREIGN PATENT DOCUMENTS

| | | |
|---|---|---|
| DE | 2359916 A1 | 6/1975 |
| DE | 004038801 A1 | 6/1992 |
| DE | 10053720 A1 | 4/2002 |
| EP | 0965371 A2 | 12/1999 |
| EP | 1033157 A2 | 9/2000 |
| EP | 2104105 A1 | 9/2009 |
| GB | 2359916 A | 9/2001 |
| GB | 2428329 A | 1/2007 |
| JP | 2003-245471 A | 9/2003 |
| JP | 2008-005288 A | 1/2008 |
| KR | 2004-0005068 A | 1/2004 |
| KR | 2010-0037413 A | 4/2010 |
| WO | WO-1996/013810 A1 | 5/1996 |
| WO | WO-2000/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/052009 A2 | 5/2008 |
| WO | WO-2008/057444 A2 | 5/2008 |
| WO | WO-2009/125404 A2 | 10/2009 |
| WO | WO-2009/137919 A1 | 11/2009 |

OTHER PUBLICATIONS

U.S. Appl. No. 14/884,285 Published as US2017/0178601, Systems and Method for Assembling a Recorded Composition, filed Oct. 15, 2015.

U.S. Appl. No. 13/033,916 U.S. Pat. No. 9,607,655 Published as US2011/0200116, System and Method for Seamless Multimedia Assembly, filed Feb. 24, 2011.

U.S. Appl. No. 13/034,645 Published as US2011/0202562, System and Method for Data Mining Within Interactive Multimedia, filed Feb. 24, 2011.

U.S. Appl. No. 13/437,164 U.S. Pat. No. 8,600,220 Published as US2013/0259442, Systems and Methods for Loading More Than One Video Content at a Time, filed Apr. 2, 2012.

U.S. Appl. No. 14/069,694 U.S. Pat. No. 9,271,015 Published as US2014/0178051, Systems and Methods for Loading More Than One Video Content at a Time, filed Nov. 1, 2013.

U.S. Appl. No. 13/622,780 U.S. Pat. No. 8,860,882 Published as US2014/0078397, Systems and Methods for Constructing Multimedia Content Modules, filed Sep. 19, 2012.

U.S. Appl. No. 13/622,795 U.S. Pat. No. 9,009,619 Published as US2014/0082666, Progress Bar for Branched Videos, filed Sep. 19, 2012.

U.S. Appl. No. 14/639,579 U.S. Pat. No. 10,474,334 Published as US2015/0199116, Progress Bar for Branched Videos, filed Mar. 5, 2015.

U.S. Appl. No. 13/838,830 U.S. Pat. No. 9,257,148 Published as US2014/0270680, System and Method for Synchronization of Selectably Presentable Media Streams, filed Mar. 15, 2013.

U.S. Appl. No. 14/984,821 U.S. Pat. No. 10,418,066 Published as US2016/0217829, System and Method for Synchronization of Selectably Presentable Media Streams, filed Dec. 30, 2015.

U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.

U.S. Appl. No. 14/107,600 U.S. Pat. No. 10,448,119 Published as US2015/0067723, Methods and Systems for Unfolding Video Pre-Roll, filed Dec. 16, 2013.

U.S. Appl. No. 14/335,381 U.S. Pat. No. 9,530,454 Published as US2015/0104155, Systems and Methods for Real-Time Pixel Switching, filed Jul. 18, 2014.

U.S. Appl. No. 15/356,913, Systems and Methods for Real-Time Pixel Switching, fied Nov. 21, 2016.

U.S. Appl. No. 14/139,996 U.S. Pat. No. 9,641,898 Published as US2015/0181301, Methods and Systems for In-Video Library, filed Dec. 24, 2013.

U.S. Appl. No. 14/140,007 U.S. Pat. No. 9,520,155 Published as US2015/0179224, Methods and Systems for Seeking to Non-Key Frames, filed Dec. 24, 2013.

U.S. Appl. No. 14/249,627 U.S. Pat. No. 9,653,115 Published as US 2015-0294685, Video Systems and Methods for Creating Linear Video From Branched, filed Apr. 10, 2014.

U.S. Appl. No. 15/481,916 Published as US 2017-0345460, Systems and Methods for Creating Linear Video From Branched Video, filed Apr. 7, 2017.

U.S. Appl. No. 16/986,977 Published as US 2020/0365187, Systems and Methods for Creating Linear Video From Branched Video, filed Aug. 6, 2020.

U.S. Appl. No. 14/249,665 U.S. Pat. No. 9,792,026 Published as US2015/0293675, Dynamic Timeline for Branched Video, filed Apr. 10, 2014.

U.S. Appl. No. 14/509,700 U.S. Pat. No. 9,792,957 Published as US2016/0104513, Systems and Methods for Dynamic Video Bookmarking, filed Oct. 8, 2014.

U.S. Appl. No. 14/534,626 Published as US-2018-0130501-A1, Systems and Methods for Dynamic Video Bookmarking, filed Sep. 13, 2017.

U.S. Appl. No. 16/865,896, Systems and Methods for Dynamic Video Bookmarking, filed May 4, 2020.

U.S. Appl. No. 17/138,434, Systems and Methods for Dynamic Video Bookmarking, filed Dec. 30, 2020.

(56) References Cited

OTHER PUBLICATIONS

U.S. Appl. No. 14/534,626 Published as US2016/0105724, Systems and Methods for Parallel Track Transitions, filed Nov. 6, 2014.
U.S. Appl. No. 14/700,845 U.S. Pat. No. 10,582,265 Published as US2016/0323608, Systems and Methods for Nonlinear Video Playback Using Linear Real-Time Video Players, filed Apr. 30, 2015.
U.S. Appl. No. 16/752,193 Published as US2020/0404382, Systems and Methods for Nonlinear Video Playback Using Linear Real-Time Video Players, filed Jan. 24, 2020.
U.S. Appl. No. 14/700,862 U.S. Pat. No. 9,672,868 Published as US2016/0322054, Systems and Methods for Seamless Media Creation, filed Apr. 30, 2015.
U.S. Appl. No. 14/835,857 U.S. Pat. No. 10,460,765 Published as US2017/0062012, Systems and Methods for Adaptive and Responsive Video, filed Aug. 26, 2015.
U.S. Appl. No. 16/559,082, Systems and Methods for Adaptive and Responsive Video, filed Sep. 3, 2019.
U.S. Appl. No. 16/800,994, Systems and Methods for Adaptive and Responsive Video, filed Feb. 25, 2020.
U.S. Appl. No. 14/978,464 Published as US2017/0178601, Intelligent Buffering of Large-Scale Video, filed Dec. 22, 2015.
U.S. Appl. No. 14/978,491 Published as US2017/0178409, Seamless Transitions in Large-Scale Video, filed Dec. 22, 2015.
U.S. Appl. No. 15/085,209 U.S. Pat. No. 10,462,202 Published as US2017/0289220, Media Stream Rate Synchronization, filed Mar. 30, 2016.
U.S. Appl. No. 15/165,373 Published as US 2017-0295410, Symbiotic Interactive Video, filed May 26, 2016.
U.S. Appl. No. 15/189,931 U.S. Pat. No. 10,218,760 Published as US 2017/0374120, Dynamic Summary Generation for Real-time Switchable Videos, filed Jun. 22, 2016.
U.S. Appl. No. 15/395,477 U.S. Pat. No. 11,050,809 Published as US 2018/0191574, Systems and Methods for Dynamic Weighting of Branched Video Paths, filed Dec. 30, 2016.
U.S. Appl. No. 17/328,261, Systems and Methods for Dynamic Weighting of Branched Video Paths, filed May 24, 2021.
U.S. Appl. No. 15/997,284 Published as US 2019/0373330, Interactive Video Dynamic Adaptation and User Profiling, filed Jun. 4, 2018.
U.S. Appl. No. 15/863,191 U.S. Pat. No. 10,257,578, Dynamic Library Display for Interactive Videos, filed Jan. 5, 2018.
U.S. Appl. No. 16/283,066 U.S. Pat. No. 10,856,049 Published as US2019/0349637, Dynamic Library Display for Interactive Videos, filed Feb. 22, 2019.
U.S. Appl. No. 17/091,149, Dynamic Library Display for Interactive Videos, filed Nov. 6, 2020.
U.S. Appl. No. 16/793,205, Dynamic Adaptation of Interactive Video Players Using Behavioral Analytics, filed Feb. 18, 2020.
U.S. Appl. No. 16/793,201, Systems and Methods for Detecting Anomalous Activities for Interactive Videos, filed Feb. 18, 2020.
U.S. Appl. No. 16/922,540, Systems and Methods for Seamless Audio and Video Endpoint Transitions, filed Jul. 7, 2020.
U.S. Appl. No. 17/334,027, Automated Platform for Generating Interactive Videos, filed May 28, 2021.
An ffmpeg and SDL Tutorial, "Tutorial 05: Synching Video," Retrieved from Internet on Mar. 15, 2013: <http://dranger.com/ffmpeg/tutorial05.html>, 4 pages.
Archos Gen 5 English User Manual Version 3.0, Jul. 26, 2007, pp. 1-81.
Barlett M, (2008), "iTunes 11: How to Queue Next Song," Technipages, Oct. 6, 2008 issue, pp. 1-8, retrieved on Dec. 26, 2013 from the internet: http://www.technipages.com/itunes-queue-next-song.html.
Google Scholar search, "Inserting metadata inertion advertising video", Jul. 16, 2021, 2 pages.
International Preliminary Report and Written Opinion of PCT/IL2012/000080 dated Aug. 27, 2013, 7 pages.
International Search Report and Written Opinion for International Patent Application PCT/IB2013/001000 dated Jul. 31, 2013 (12 pages).
International Search Report for International Patent Application PCT/IL2010/000362 dated Aug. 25, 2010 (2 pages).
International Search Report for International Patent Application PCT/IL2012/000081 dated Jun. 28, 2012 (4 pages).
International Search Report of PCT/IL2012/000080 dated Aug. 9, 2012, 4 pages.
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-8).
Marciel, M. et al., "Understanding the Detection of View Fraud in Video Content Portals", (Feb. 5, 2016), Cornell University, pp. 1-13.
Miller, Gregor et al., "MiniDiver: a Novel Mobile Media Playback Interface for Rich Video Content on an iPhoneTM", Entertainment Computing A ICEC 2009, Sep. 3, 2009, pp. 98-109.
Sodagar, I., "The MPEG-DASH Standard for Multimedia Streaming Over the Internet", IEEE Multimedia, IEEE Service Center, New York, NY US, (2011) 18(4): 62-67.
Supplemental European Search Report for EP10774637.2 (PCT/IL2010/000362) dated Jun. 28, 2012 (6 pages).
Supplemental European Search Report for EP13184145, (dated Jan. 30, 2014), 3 pages.
Yang, H, et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).

\* cited by examiner

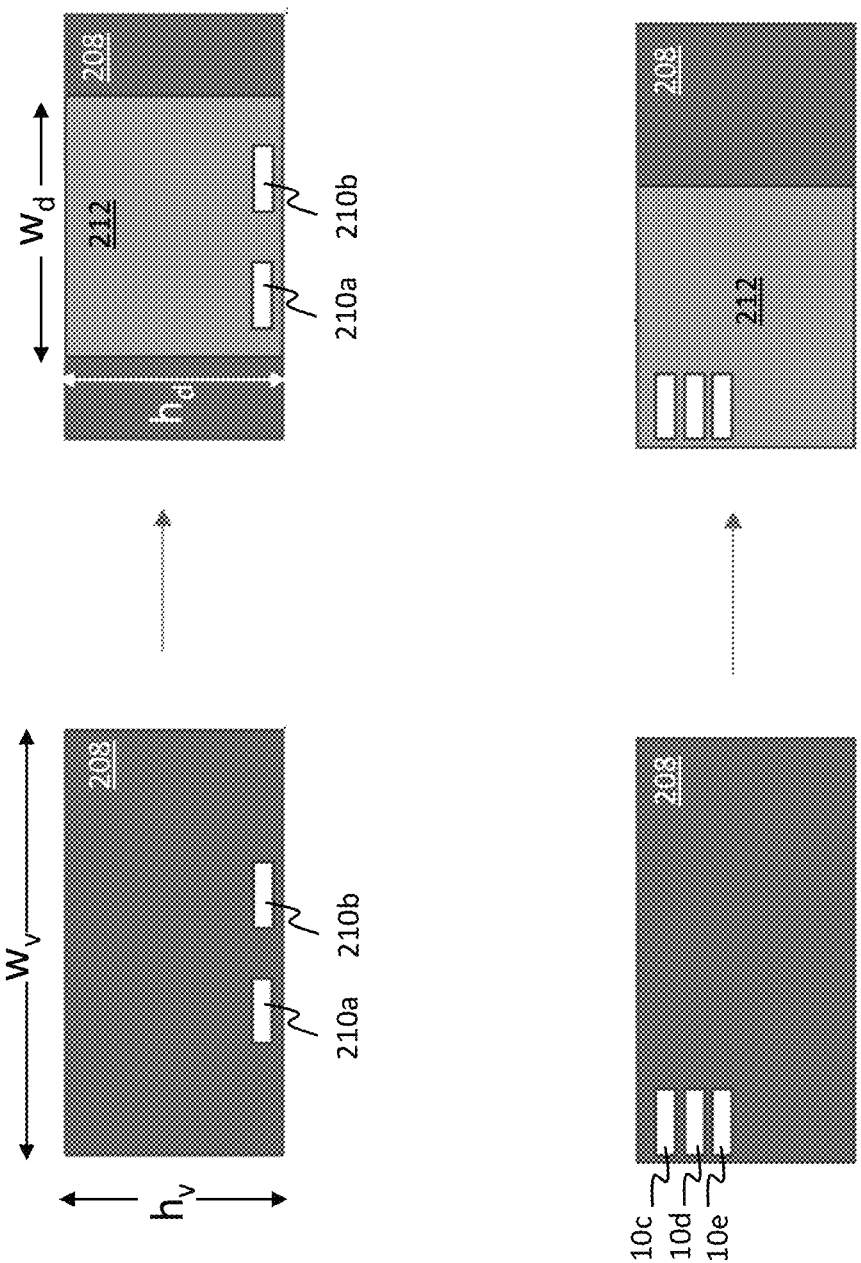

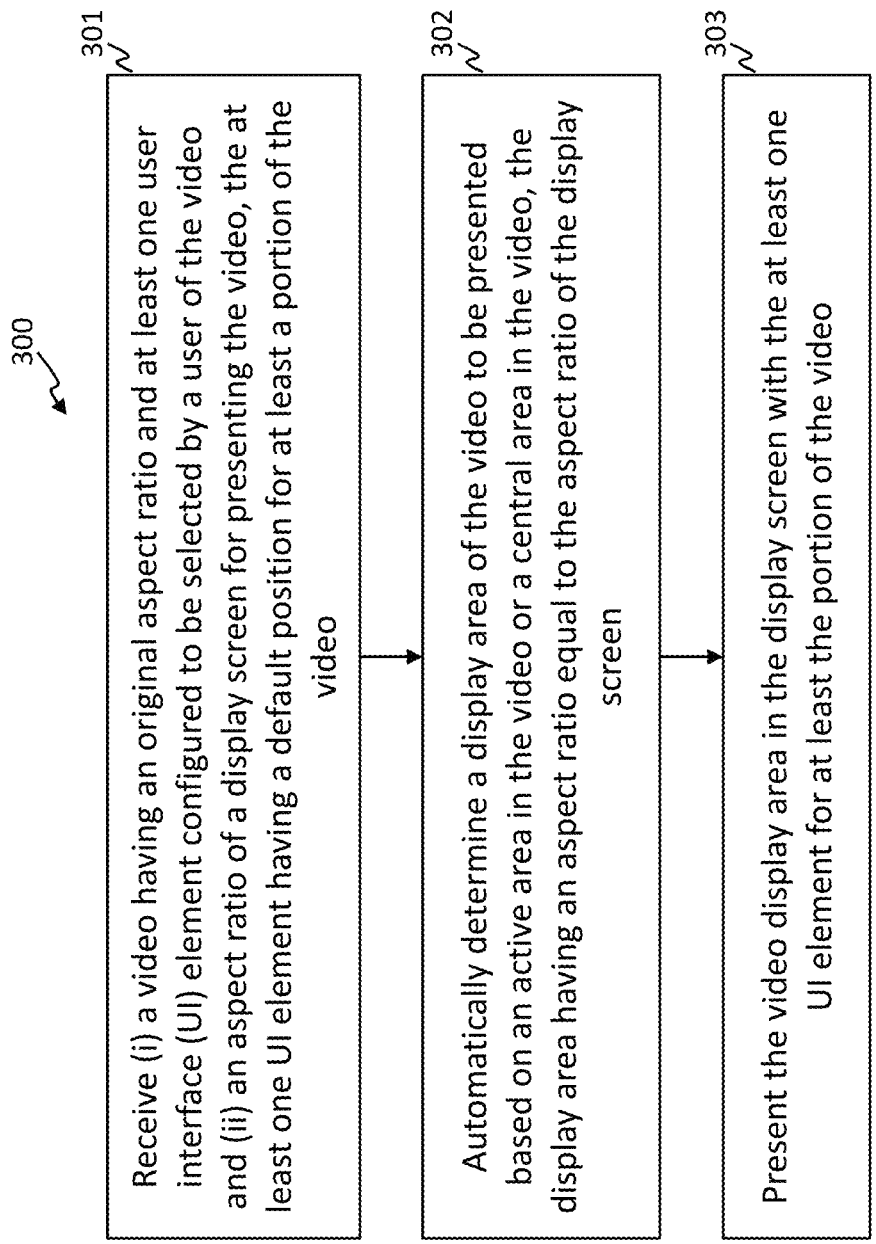

SYSTEMS AND METHODS FOR DYNAMICALLY ADJUSTING VIDEO ASPECT RATIOS

TECHNICAL FIELD

The following disclosure is directed to methods and systems for dynamically adjusting aspect ratios of videos and, more specifically, methods and systems for dynamically adjusting aspect ratios of videos via automatically determining the display area of the videos and/or dynamically re-encoding the videos.

BACKGROUND

Aspect ratio is the ratio of the width (w) of a display compared to its height (h) and is typically expressed as w:h. Aspect ratio can be important in displaying images or video in a display, especially when the aspect ratio of the image(s) (or the images that compose a video) is different from the screen used to display the image(s). Two conventional methods exist for adjusting the aspect ratio of an image(s) to conform to a given screen. One conventional method is "pan-and-scan" in which the screen is entirely (or nearly entirely) filled with the image but due to the difference in the screen aspect ratio and the image aspect ratio, a part of the image is lost or not displayed. The selection may be performed manually by a user. Another conventional method is "boxing" which can include "letterboxing", "pillarboxing", or "windowboxing". By letterboxing an image, the entire image is fit inside the screen boundaries and any space remaining on the top and bottom of the image is filled in with bars or "mattes". These mattes are typically black but can be any color. Similarly, in pillarboxing, any remaining space on the left and right sides of the image is filled in with mattes. In windowboxing, the image is surrounded on all four edges with mattes, creating the "window" effect. These techniques can be challenging for videos that have interactive components and/or include multiple videos with different aspect ratios.

SUMMARY

Disclosed herein are systems and methods for dynamically adjusting video aspect ratios. Specifically, for videos that include user interface elements and/or multiple videos with different aspect ratios, dynamic adjustment of the video's aspect ratio can be beneficial in providing a desirable user experience.

In one aspect, the disclosure features a method for dynamically adjusting an aspect ratio of a video in which the method includes receiving (i) a video having an original aspect ratio and at least one user experience (UX) (e.g., user interface (UI)) element configured to be selected by a user of the video and (ii) an aspect ratio of a display screen for presenting the video. The UI element(s) can have a default position for at least a portion of the video. The method can include automatically determining a display area of the video to be presented based on at least one of: (i) the default position of the at least one UI element in the video, (ii) an active area in the video, or (iii) a central area in the video, the display area having an aspect ratio equal to the aspect ratio of the display screen; and presenting the video display area in the display screen with the at least one UI element for at least the portion of the video.

Various embodiments of the method can include one or more of the following features. Automatically determining the display area of the video to be presented can be based on the default position of the at least one UI element. The at least one UI element can be configured to be displayed for the portion of the video. The display area of the video to be presented can include the default position of the at least one UI element in the video. The method can include determining the central area in the video, the central area having an aspect ratio equal to the aspect ratio of the display screen; and for another portion of the video without the at least one UI element, presenting the central area in the display screen.

The method can include determining the active area in the video, the active area having an aspect ratio equal to the aspect ratio of the display screen; and for another portion of the video without the at least one UI element, presenting the active area in the display screen. The active area can be determined based on collected user data comprising data of user cursor position within the display screen. The at least one UI element can be invisible to the user of the video for the portion of the video. Automatically determining the display area of the video to be presented can be based on the active area in the video. The display area can include the active area in the video. The method can further include moving the at least one UI element to the active area for at least the portion of the video.

Automatically determining the display area of the video to be presented can be based on the central area in the video. The display area can include the central area in the video. The method can include moving the at least one UI element to the central area for at least the portion of the video. Automatically determining the display area of the video to be presented can be based on the active area in the video. The display area can include the active area in the video. The method can include determining whether the default position of the at least one UI element is within the display area; if the default position of the at least one UI element is outside of the display area, reducing a size of the video such that the at least one UI element is within the display area; and adding at least one matted area to the video, the matted area equal to a difference between the display area and an area of the reduced-size video. The video can include a plurality of video segments organized into a video tree having at least two paths. Automatically determining the display area of the video to be presented based on the active area in the video is performed individually for each video segment of the plurality of video segments.

In another aspect, the disclosure features a method for dynamically adjusting an aspect ratio of a video in which the method includes receiving (i) a video having an original aspect ratio and (ii) a first aspect ratio. The original aspect ratio can be different from the first aspect ratio. The method includes storing the original aspect ratio as separate data from the video; and encoding the video such that at least a first matted area equal to a difference between an area of the first aspect ratio and an area of the original aspect ratio is added to the video. The method includes transmitting the encoded video for presentation in a display screen with the stored original aspect ratio, the display screen having a second aspect ratio different from the first aspect ratio and the original aspect ratio. The transmitting can include decoding the video to remove the first matted area according the stored original aspect ratio; and re-encoding the video such that the video is presented according to the second aspect ratio. The method can include presenting the re-encoded video in the display screen.

Various embodiments of the method can include one or more of the following features. The transmitting can be performed in real time or near real time with the presenting.

The re-encoding the video can include adding a second matted area to the video in preparation for presentation of the video in the second display screen. The second matted area can be equal to a difference between an area of the original aspect ratio and an area of the second aspect ratio. The second matted area can include a first bar and a second bar added to a top and a bottom, respectively, of the video. The second matted area can include a first bar and a second bar added to a left side and a right side, respectively, of the video. Re-encoding the video can include determining an area of visual interest in the video, the area having an aspect ratio equal to the second aspect ratio; and removing one or more portions of the video outside of the area of visual interest.

The video can include a plurality of video segments organized into a video tree having at least two paths. Each segment of the plurality of video segments has a respective original aspect ratio. A first original aspect ratio of at least a first video segment can be different from a second original aspect ratio of at least a second video segment. The transmitting the encoded video for presentation in the second display screen with the stored original aspect ratio can include transmitting each video segment for presentation in the second display screen with the respective original aspect ratio. The first matted area can include a first bar and a second bar added to a top and a bottom, respectively, of the video. The first matted area can include a first bar and a second bar added to a left side and a right side, respectively, of the video. The method can be for dynamically adjusting the aspect ratio for at least two videos, wherein at least one video of the at least two videos has an aspect ratio different from the original aspect ratio.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

FIGS. 2B-2C are diagrams illustrating the examples of dynamic adjustment according to the method of FIG. 2A.

FIG. 3A is a flowchart of an exemplary method for dynamically adjusting of a video aspect ratio based on UX element(s) position in the video.

DETAILED DESCRIPTION

Described herein are various implementations of methods and supporting systems for dynamically adjusting aspect ratios of videos.

High-Level System Architecture

Figure 1:
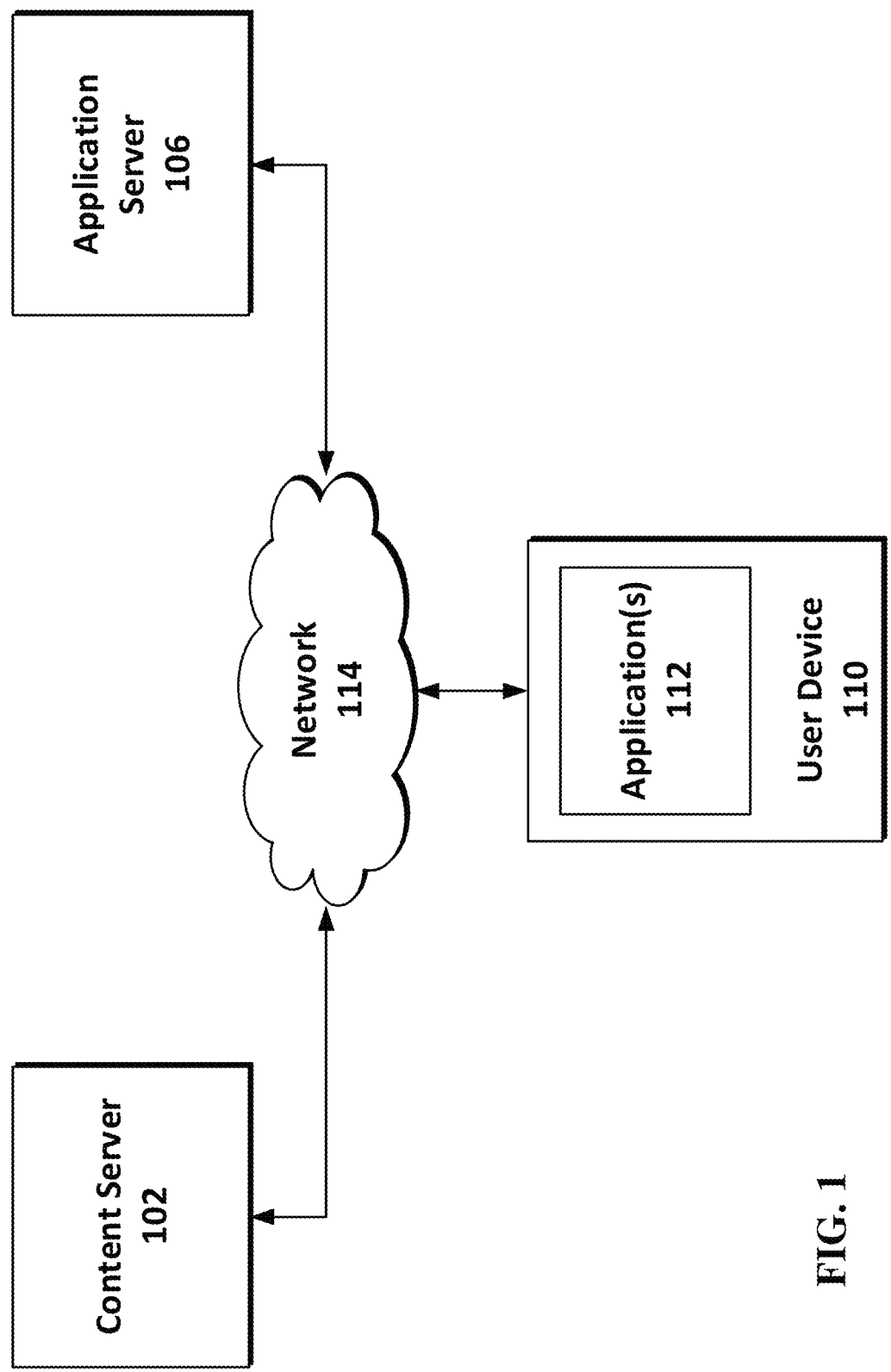
FIG. 1 depicts a high-level system architecture for providing interactive media content according to an implementation.

FIG. 1 depicts a high-level architecture of such a system according to an implementation. A media presentation having multiple video and/or audio streams can be presented to a user on a user device 110 having one or more application(s) 112 that together are capable of playing and/or editing the content and displaying a video library where information associated with videos can browsed and videos can be selected for playback. The user device 110 can be, for example, a smartphone, tablet, laptop, desktop, palmtop, television, gaming device, virtual reality headset, smart glasses, smart watch, music player, mobile telephone, workstation, or other computing device configured to execute the functionality described herein. The user device 110 can have output functionality (e.g., display monitor, touchscreen, image projector, etc.) and input functionality (e.g., touchscreen, keyboard, mouse, remote control, etc.).

The application 112 can be a video player/editor and library browser that is implemented as a native application, web application, or other form of software. In some implementations, the application 112 is in the form of a web page, widget, and/or Java, JavaScript, .Net, Silverlight, Flash, and/or other applet or plug-in that is downloaded to the user device 110 and runs in conjunction with a web browser. The application 112 and the web browser can be part of a single client-server interface; for example, the application 112 can be implemented as a plugin to the web browser or to another framework or operating system. Any other suitable client software architecture, including but not limited to widget frameworks and applet technology, can also be employed.

Media content can be provided to the user device 110 by content server 102, which can be a web server, media server, a node in a content delivery network, or other content source. In some implementations, the application 112 (or a portion thereof) is provided by application server 106. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

The user device 110, content server 102, application server 106, and/or other devices and servers can communicate with each other through communications network 114. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

More generally, the techniques described herein can be implemented in any suitable hardware or software. If implemented as software, the processes can execute on a system capable of running one or more custom operating systems or commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented a computer including a processing unit, a system memory, and a system bus that couples various system components including the system memory to the processing unit.

The system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Media Presentations

The media presentations referred to herein can be structured in various forms. For example, a particular media presentation can be an online streaming video having multiple tracks or streams that a user can switch among in real-time or near real-time. For example, a media presentation can be structured using parallel audio and/or video tracks as described in U.S. patent application Ser. No. 14/534,626, filed on Nov. 6, 2014, and entitled "Systems and Methods for Parallel Track Transitions," the entirety of which is incorporated by reference herein. More specifically, a playing video file or stream can have one or more parallel tracks that can be switched among in real-time automatically and/or based on user interactions. In some implementations, such switches are made seamlessly and substantially instantaneously, such that the audio and/or video of the playing content can continue without any perceptible delays, gaps, or buffering. In further implementations, switches among tracks maintain temporal continuity; that is, the tracks can be synchronized to a common timeline so that there is continuity in audio and/or video content when switching from one track to another (e.g., the same song is played using different instruments on different audio tracks; same storyline performed by different characters on different video tracks, and the like).

Such media presentations can also include interactive video structured in a video tree, hierarchy, or other form. A video tree can be formed by nodes that are connected in a branching, hierarchical, or other linked form. Nodes can each have an associated video segment, audio segment, graphical user interface (GUI) elements, and/or other associated media. Users (e.g., viewers) can watch a video that begins from a starting node in the tree and proceeds along connected nodes in a branch or path. Upon reaching a point during playback of the video where multiple video segments (child nodes) branch off from a segment (parent node), the user can interactively select the branch or path to traverse and, thus, the next video segment to watch.

As referred to herein, a particular branch or path in an interactive media structure, such as a video tree, can refer to a set of consecutively linked nodes between a starting node and ending node, inclusively, or can refer to some or all possible linked nodes that are connected subsequent to (e.g., sub-branches) or that include a particular node. Branched video can include seamlessly assembled and selectably presentable multimedia content such as that described in U.S. patent application Ser. No. 13/033,916, filed on Feb. 24, 2011, and entitled "System and Method for Seamless Multimedia Assembly" (the "Seamless Multimedia Assembly application"), and U.S. patent application Ser. No. 14/107,600, filed on Dec. 16, 2013, and entitled "Methods and Systems for Unfolding Video Pre-Roll," the entireties of which are hereby incorporated by reference.

The prerecorded video segments in a video tree or other structure can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played. The video segments can include, for example, one or more predefined, separate multimedia content segments that can be combined in various manners to create a continuous, seamless presentation such that there are no noticeable gaps, jumps, freezes, delays, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the end of the segment itself.

If a user does not make a selection at a decision point or during a decision period, a default, previously identified selection, or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, stored user profiles, preferred products or services, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments can form a seamless multimedia content path or branch, and users can take multiple paths over multiple playthroughs, and experience different complete, start-to-finish, seamless presentations. Further, one or more multimedia segments can be shared among intertwining paths while still ensuring a seamless transition from a previous segment and to the next segment. The content paths can be predefined, with fixed sets of possible transitions in order to ensure seamless transitions among segments. The content paths can also be partially or wholly undefined, such that, in some or all instances, the user can switch to any known video segment without limitation. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. Some or all of the displayed options can hover and then disappear when the decision period ends or when an option has been selected. Further, a timer, countdown or other visual, aural, or other sensory indicator can be presented during playback of content segment to inform the user of the point by which he should (or, in some cases, must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

A segment that is played after (immediately after or otherwise) a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

Dynamic Adjustment Based on User Experience (UX) Element(s) Position

In a "pan-and-scan" scheme, a display screen is filled with a selected area of an image or a frame of a video. The portion of the image or frame may be selected based on the "action" area (or the part of the video having greater action than other parts of the video) or based on a central area of the video.

Figure 2A:
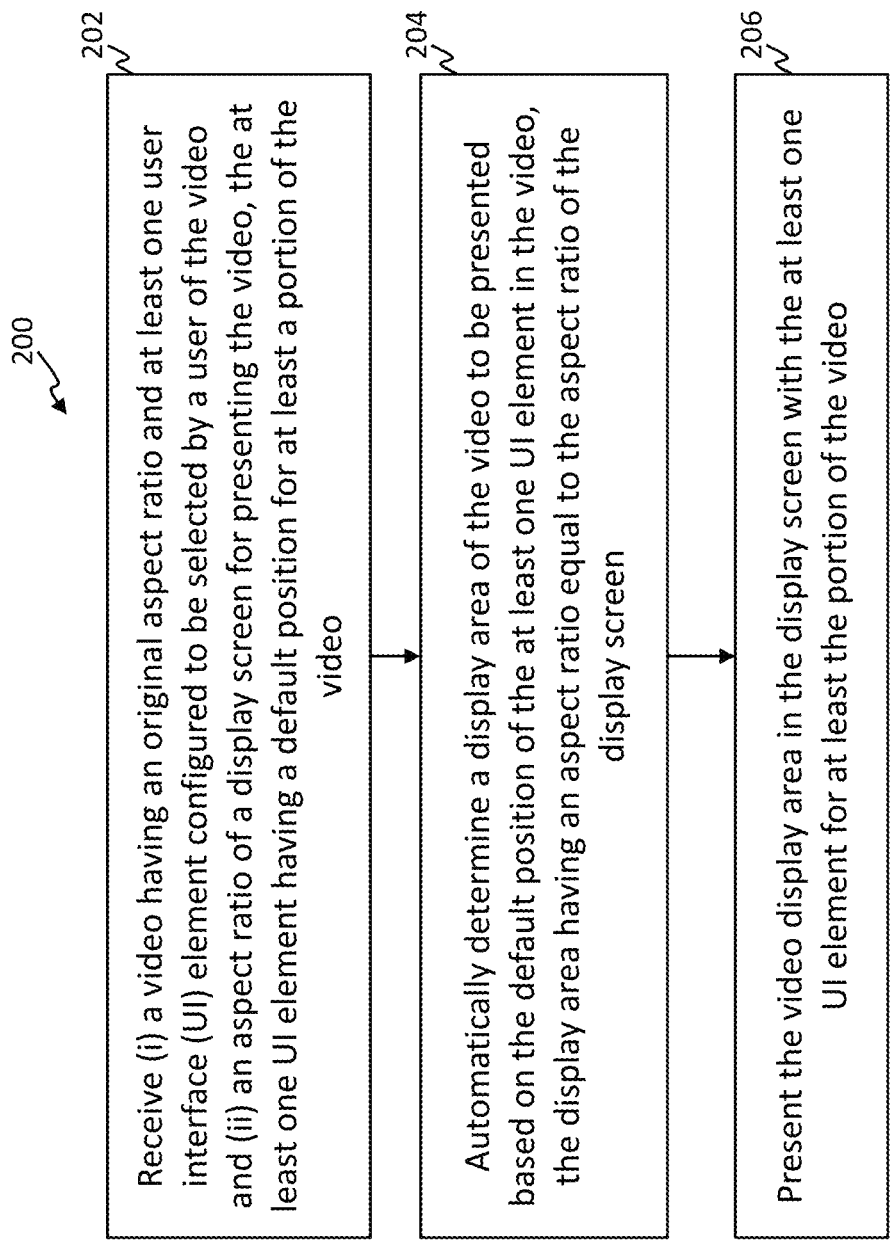
FIG. 2A is a flowchart of an exemplary method for dynamically adjusting of a video aspect ratio based on UX element(s) position in the video.

FIG. 2A is a flowchart of an exemplary method 200 for dynamically adjusting of a video aspect ratio based on UX element(s) position in the video frame(s). FIGS. 2B-2C are diagrams illustrating the examples of dynamic adjustment according to the method 200.

In step 202 of exemplary method 200, a video 208 having at least one UX element (e.g., elements 210a, 210b, 210c, 210d, 210e (collectively referred to as 210)) configured to be selected by a user of the video is received. The video 208 has an original aspect ratio of $w_v:h_v$. For example, the exemplary video 208 can have an aspect ratio $w_v:h_v$ of 16:7. In some embodiments, multiple videos 208 can be received (e.g., multiple videos forming a branching video as described above). For example, at least one of the videos can have an aspect ratio (e.g., $w_{v1}:h_{v1}$) different from other videos (e.g., $w_{v2}:h_{v2}$, $w_{v3}:h_{v3}$, $w_{v4}:h_{v4}$, etc.). As illustrated in FIGS. 2B and 2C, the UX element(s) 210 can have default positions in various areas of the video 208. For example, the UX element(s) 210 may appear in a central area of the video 208 or in the area displaying greater action. In another example, the UX element(s) 210 may appear to a side area or corner of the video 208. In some embodiments, the UX element(s) 210 may appear in the video for a portion of the video's duration (e.g., for a time less than the video's length). In some embodiments, the UX element(s) 210 may appear for one or more videos of the multiple videos (e.g., branching videos) or at points between videos.

In step 202, the aspect ratio $w_d:h_d$ of the display screen 212 for presenting the video 208 is received. For example, the display screen 212 can have a different aspect ratio $w_d:h_d$ (e.g., 13:7) than the aspect ratio $w_v:h_v$ (e.g., 16:7) of the video 208. Common display aspect ratios $w_d:h_d$ include 4:3, 16:10, 5:3, 16:9, etc. Another example includes smartphone displays which can display "vertical video" with a vertically-oriented aspect ratio $w_d:h_d$ (e.g., 9:16).

In step 204, the display area of the video 208 may be automatically determined based on the default position of the UX element(s) in the video. For example, the display area of the video 208 can be automatically determined based on the default position of UX element(s) 210 in the video 208. The display area can be determined by comparing the aspect ratios of the display screen 212 and the video 208 such that the display screen 212 is entirely or almost entirely filled in. For example, in FIG. 2B, the display area is determined by determining the particular area (e.g., center-bottom area) of the video 208 having the UX elements 210a, 210b. In another example, in FIG. 2C, the display area is determined by determining the particular area (e.g., far left area) of the video 208 having the UX elements 210c, 210d, and 210e.

In step 206, the video display area having the UX element(s) 210 is presented in the display screen 212 for at least a portion of the video 208. For example, the UX element(s) 210 may be presented for a particular duration of the video 208 (e.g., at the beginning, at the end, during the video, at a branching point, etc. of the video 208).

Dynamic Adjustment Based on Screen Position

Figure 3B:
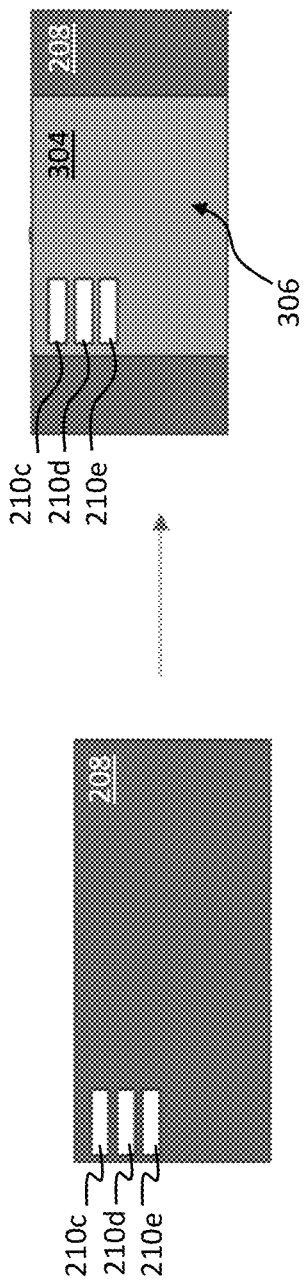
FIG. 3B is a diagram illustrating the examples of dynamic adjustment according to the method of FIG. 3A.

In some embodiments, the display area of a video may be selected based on the active area in the video itself and/or a central area of the video. FIG. 3A is a flowchart of an exemplary method 300 for dynamically adjusting of a video aspect ratio based on UX element(s) position in the video frame(s). FIG. 3B is a diagram illustrating the examples of dynamic adjustment according to the method 300.

In step 301 of exemplary method 300, a video 208 having at least one UX element (e.g., elements 210a, 210b, 210c, 210d, 210e (collectively referred to as 210)) configured to be selected by a user of the video is received. The video 208 has an original aspect ratio of $w_v:h_v$. Additionally, in step 301, the aspect ratio $w_d:h_d$ of the display screen 304 for presenting the video 208 is received.

In step 302, the display area of the video 208 may be automatically determined based on the an active area in the video 208 or a central area in the video 208. The display area can have an aspect ratio equal to the aspect ratio $w_d:h_d$ of the display screen 304. In some embodiments, method 300 includes determining the active area or central area in the video 208. Note that the active area and the central area in a video may not necessarily coincide. In some embodiments, method 300 includes moving the UX elements 210 from their default position to the active area or central area. For example, in FIG. 3B, the UX elements 210c, 210d, and 210e are in the far left area of the video 208. Having determined the active area (or central area) 306 of the video 208, the UX elements 210c, 210d, and 210e may be moved from its original position to the active area 306.

In some embodiments, one or more characteristics (e.g., size, shape, color, associated audio, etc.) of the UX element(s) 210 can be changed. For example, the size of the UX element(s) 210 can be changed when the element(s) 210 move from one area of the video to another area. If, for example, the default position of element(s) 210 was near the edge of the video 208, the size of the element(s) 210 may be larger to catch the attention of a viewer of the video 208. If the element(s) 210 are moved to a more central area (or active area) 306 of the video 208, the size of the element(s) 210 may be reduced, under the assumption that a viewer's attention would naturally be attracted to the central area or active area 306.

In some embodiments, multiple videos 208 may be received in which at least one of the videos has a different aspect ratio (e.g., $w_{v3}:h_{v3}$) than the other videos in the multiple videos (e.g., $w_{v1}:h_{v1}$, $w_{v2}:h_{v2}$, $w_{v4}:h_{v4}$, etc.). In some embodiments, the active area may be determined individually for two or more videos of the multiple videos. Accordingly, the adjusted positions for the UX element(s) 210 may be different for the individually-determined active areas of the two or more videos. Therefore, the positions of the UX element(s) 210 may change from video to video in the multiple videos. In some embodiments, the UX element(s) 210 may be in different positions in each of two or more videos of the multiple videos. In such a case, the UX element(s) 210 may be moved to be in the same or similar positions from video to video in the multiple videos.

In step 303, the video display area having the UX element(s) 210 is presented in the display screen 212 for at least a portion of the video 208. For example, the UX element(s) 210 may be presented for a particular duration of the video 208 (e.g., at the beginning, at the end, during the video, at a branching point, etc. of the video 208).

In some embodiments, the display area of the video 208 can be automatically determined on two or more factors: (i) the default position of the UX element(s) in the video, (ii) an active area in the video, and/or (iii) a central area in the video, as described above. In some embodiments, the automatic determination may depend on the timing of the one or more factors. For example, the display area may be determined for a first duration of the video(s) 208 based on the active area in the video or the central area of the video and, for a second duration, the display area may change to the portion of the video including the default position of the UX element(s) 210 (or vice or versa).

Dynamic Adjustment Between Pan-and-Scan and Boxing

Figure 4C:
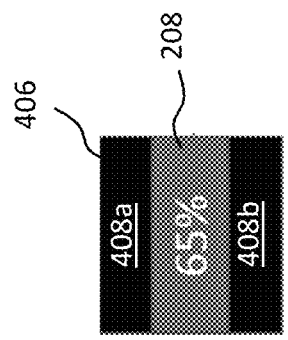
FIG. 4C is a diagram illustrating an exemplary display screen that is sized and/or shaped such that only a particular amount of the video can be displayed.
Figure 4B:
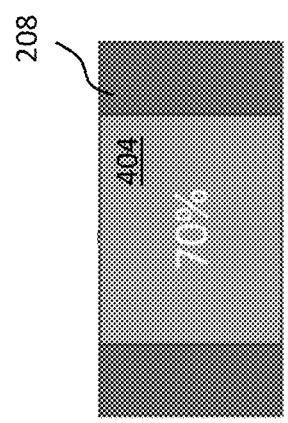
FIGS. 4A-4B are diagrams illustrating two examples of video being displayed in a display screen.
Figure 4A:
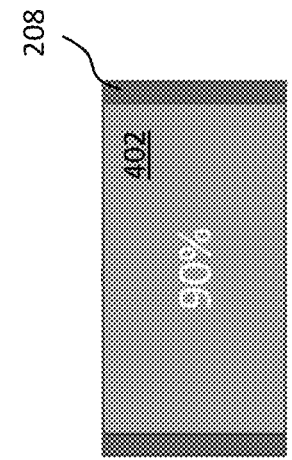

In some embodiments, automatically determining the display area can include determining whether the display screen is too small or shaped such that a minimum area of a video cannot be displayed. In some embodiments, the video(s) 208 may be associated with a threshold that determines the amount of the video 208 that can be "cut" or not displayed in the screen (e.g., screen 212 or 304). The threshold may be 60% or greater, 70% or greater, 80% or greater, 90% or greater. For example, for a threshold of 70%, if 70% or more of the video 208 is able to be displayed in the screen, the display screen will display 70% of the video 208 in "pan-and-scan" mode. FIGS. 4A-4B illustrate two examples of video 208 being displayed in a display screen 402 and 404, respectively. Display screen 402 allows for approximately 90% of the video 208 to be displayed while display screen 404 allows for approximately 70% of the video 208 to be displayed.

If less than 70% of the video 208 can be displayed, then the display mode can change from "pan-and-scan" to "boxing". In other words, if a display screen is too small or shaped such that less than 70% of the video 208 can be displayed, 70% or more of the video 208 frame is then displayed within the display screen with added mattes. FIG. 4C illustrates a display screen 406 that is sized and/or shaped to allow only 65% of the video 208 to be displayed. Therefore, in some embodiments, in "boxing" mode, 70% or more of the video 208 is instead displayed (e.g., 90%, 100%, such that aspect ratio $w_v:h_v$ is maintained, etc.) within the display screen 406 and empty areas 408a, 408b between the screen's boundaries and the video 208. This form of "boxing" is also referred to as "letterboxing". In some embodiments, a combination of pan-and-scan and boxing may be used such that at least a threshold amount of video 208 is displayed (e.g., between 70% and 100% of the video 208).

Figure 5:
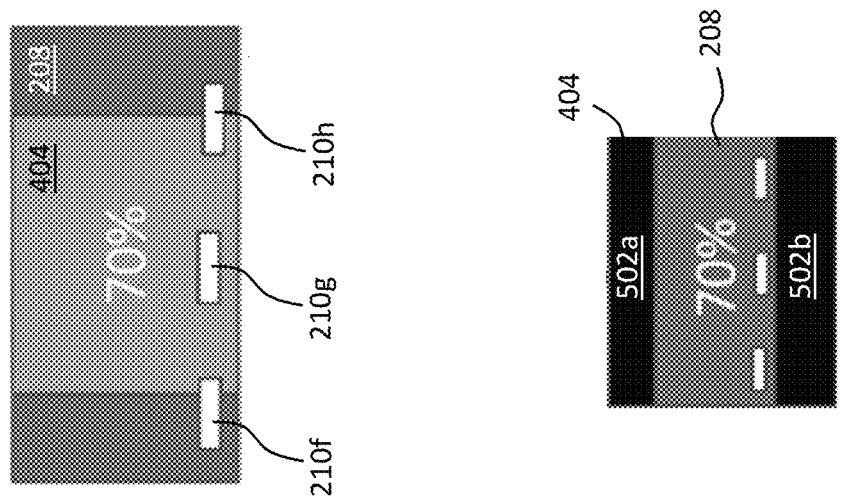
FIG. 5 is a diagram of a video having UX element(s) relative to a display screen.
Figure 5:
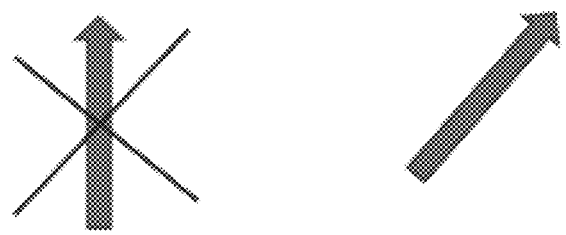
Figure 5:
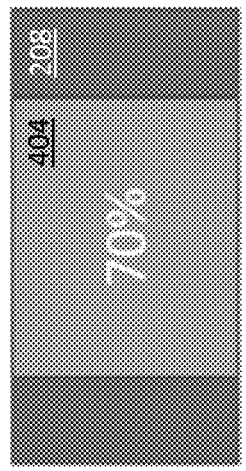

In some embodiments, automatically determining the display area can include determining whether the default position of the UX element(s) 210 is within the display area. In some embodiments, the threshold may be determined by the existence of the UX element(s) 210 in the video 208. Further, the threshold may be determined by the size and/or position of the UX element(s) 210 in the video 208. For example, if the UX element(s) 210 are positioned toward an outer edge of the video 208, the threshold is likely to be higher to accommodate the position of the UX element(s) 210, thereby ensuring that the UX element(s) 210 are displayed within the display screen. FIG. 5 is a diagram of a video 208 having UX element(s) 210 relative to a display screen 404. In this embodiment, one or more portions of the video (or video) 208 has UX element(s) 210f, 210g, and 210h (collectively referred to as 210). Note that, in "pan-and-scan" mode, portions of two of the elements 210f and 210h lie outside the area defined by the display screen 404 and therefore those portions would not be displayed to the viewer, creating a suboptimal viewing experience. Instead, the video 208 may instead be displayed in "boxing" mode, in which 70% or more of the video 208 is displayed with mattes 502a, 502b added in areas between the display screen boundary and one or more edges of the video 208. In this "boxing" mode, the UX element(s) are fully displayed to the viewer in the display screen 404.

In some embodiments, the video 208 can include multiple videos. In such a case, each video of the multiple videos 208 can have a threshold. In some embodiments, at least one threshold may be different from the other thresholds. Therefore, the transition from "pan-and-scan" mode to "boxing" mode may differ from video to video based on the different threshold(s). In some embodiments, the videos may have different UX element(s) in different locations. In this case, the transition from "pan-and-scan" mode to "boxing" mode may differ from video to video based on the UX element(s). In some embodiments, it is important that the transition from "pan-and-scan" mode to "boxing" mode be smooth and/or imperceptible to the viewer. In some embodiments, the transition may be determined by the video creator (e.g., at a scene change, change between videos in a branching video, before UX element(s) 210 appear, after UX element(s) appear, etc.). The transition may be immediate or gradual.

Dynamic Unboxing

Figure 6A:
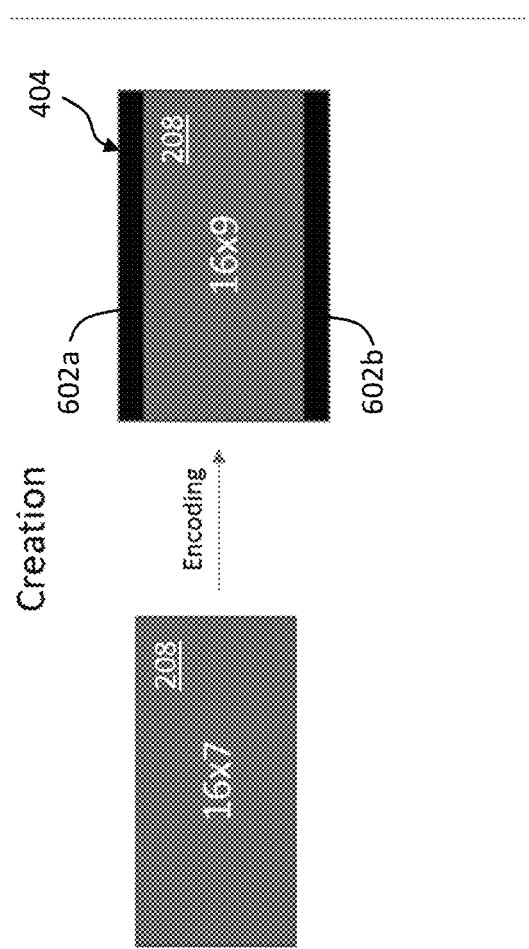
FIG. 6A is a diagram illustrating the "boxing" and playback of a video.

FIG. 6A is a diagram illustrating the "boxing" and playback of a video 208. In "boxing" mode, a video having an aspect ratio $w_v:h_v$ can be encoded with mattes 602a, 602b on the top and bottom sides of the video 208 (also referred to as letterboxing). The letterboxed video is then played back in a video player.

Figure 6B:
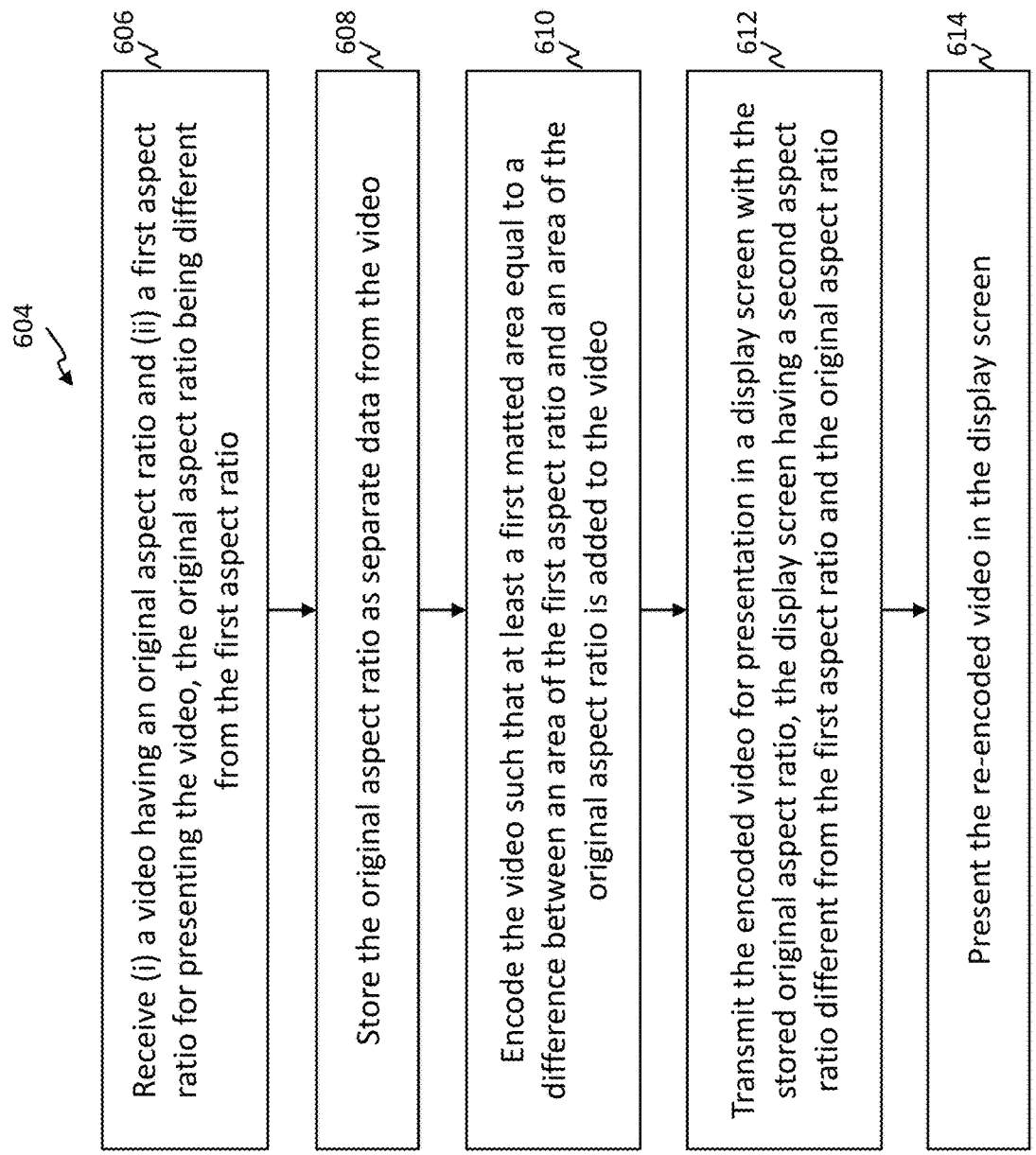
FIG. 6B is a flowchart of an exemplary method for dynamically adjusting the aspect ratio of a video.
Figure 6C:
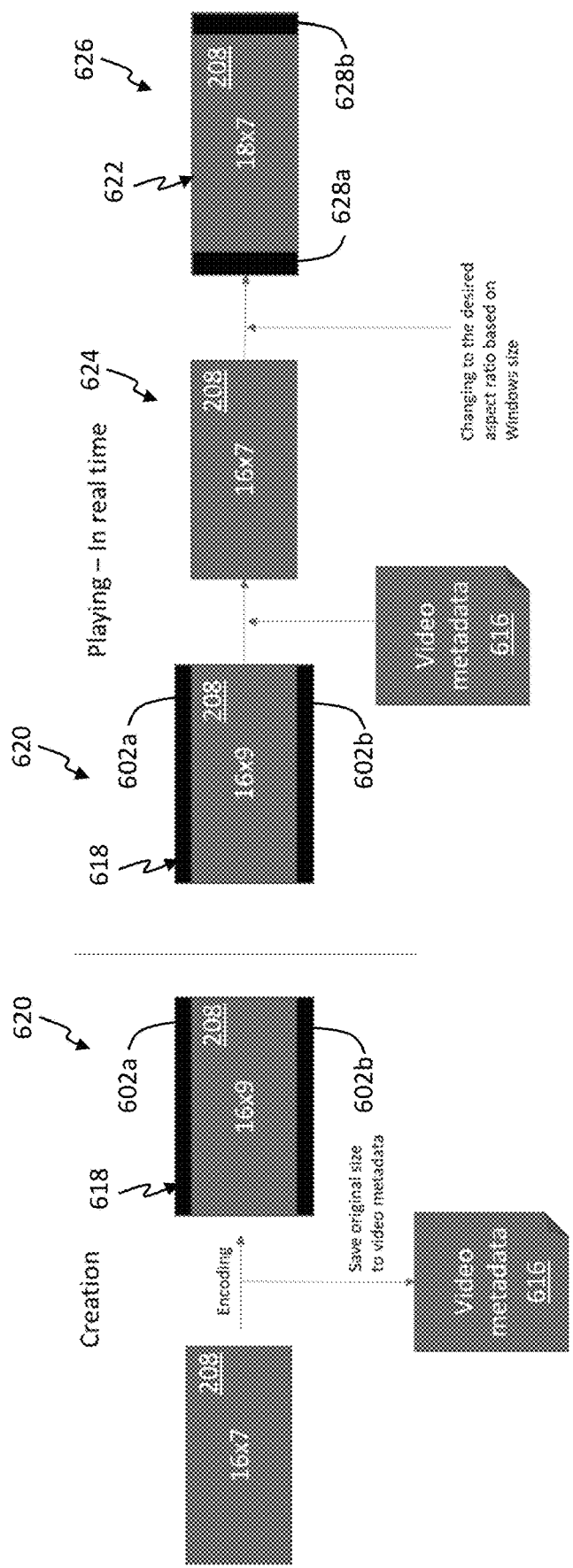
FIG. 6C is a diagram illustrating the encoding of a video according to the method of FIG. 6B.

FIG. 6B is a flowchart of an exemplary method 604 for dynamically adjusting the aspect ratio of a video. FIG. 6C is a diagram illustrating the encoding of a video 208 according to the method 604. In step 606, one or more videos 208 having aspect ratio(s) $w_v:h_v$ can be received. In some cases, multiple videos 208 can be received in which at least one video 208 may have a ratio $w_v:h_v$ different than that of other videos. Additionally, a first aspect ratio $w_{d1}:h_{d1}$, different from the video's original aspect ratio $w_v:h_v$, for presenting the video(s) 208 can be received.

In step 608, the video's original aspect ratio $w_v:h_v$ can be stored separately (e.g., as separate metadata 616) from the video(s) 208. In step 610, the video(s) 208 can be encoded such that at least one matte (e.g., 602a, 602b (collectively referred to as 602)) is added to the video 208. The matte(s) 602 can have an area equal to a difference between the area of the display area 618 and the video 208.

In step 612, the encoded video 620 is transmitted for presentation in a display screen 622 with the stored original aspect ratio $w_v:h_v$ 616. The display screen 622 can have a second aspect ratio $w_{d2}:h_{d2}$ (e.g., 18×7) different from the first aspect ratio $w_{d1}:h_{d1}$ and the original aspect ratio $w_v:h_v$. In some embodiments, step 612 can include decoding the encoded video 620 to remove the mattes 602a, 602b according to the stored original aspect ratio $w_v:h_v$ 616. The original aspect ratio $w_v:h_v$ (e.g., 16×7) can be restored in the decoded video 624. Step 612 can include re-encoding the decoded video 624 according to the second aspect ratio $w_{d2}:h_{d2}$. In some embodiments, the re-encoding may include "boxing" the video 624, as illustrated in FIG. 6C. This type of "boxing" is referred to as "pillarboxing" in which the mattes 628a, 628b are added to the video 624. In some embodiments, the re-encoding may include "pan-and-scanning" the video 624 to accommodate the second aspect ratio $w_{d2}$:$h_{d2}$. As discussed above, in "pan-and-scan" mode, the portion of the video that is retained for display in screen 622 can be those portions corresponding to an active area or a central area.

In step 614, the re-encoded video 626 can be presented in display screen 622 having the second aspect ratio $w_{d2}$:$h_{d2}$ (e.g., 18×7). In some embodiments, the transmission (in step 612) of the encoded video for presentation in the display screen 622 can be in real-time or near real-time with the presenting (in step 614).

In some embodiments, multiple videos 208 can be received and processed according to exemplary method 604, as described above. This can be beneficial in circumstances in which one or more videos have different aspect ratios $w_v$:$h_v$ from the other videos. For example, multiple videos may be drawn from different sources to create a presentation (e.g., a branching video, as described above). These videos may have different aspect ratios, especially if they were filmed using different video cameras or originally encoded for a different aspect ratio than the ultimate display screen. Each of the corresponding aspect ratios of the multiple videos may be stored separately as metadata 616.

In some embodiments, a branching video tree may include at least two paths of video segments. One or more of these video segments may have different aspect ratios $w_v$:$h_v$ (e.g., $w_{v1}$:$h_{v1}$, $w_{v2}$:$h_{v2}$, etc.) from the other segments that present a challenge in presenting the branching video tree in a single display screen 622 having a particular aspect ratio $w_{d2}$:$h_{d2}$. By using method 604, multiple videos can be received with their respective aspect ratios $w_v$:$h_v$ and ultimately re-encoded for the display screen 622, using the steps described above.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A method for dynamically adjusting an aspect ratio of a video, the method comprising:
   receiving (i) a video having an original aspect ratio and at least one user interface (UI) element configured to be selected by a user of the video and (ii) an aspect ratio of a display screen for presenting the video, the at least one UI element having a default position for at least a portion of the video;
   automatically determining a display area of the video to be presented based on an active area in the video, the display area including the active area in the video and having an aspect ratio equal to the aspect ratio of the display screen;

determining that the default position of the at least one UI element is outside the display area;

adjusting, in response to a determination that the default position of the at least one UI element is outside of the display area, a size of the video such that the at least one UI element is within the display area; and presenting the display area in the display screen with the at least one UI element for at least the portion of the video, wherein the video comprises a plurality of video segments organized into a video tree having at least two paths and wherein (1) automatically determining the display area of the video to be presented based on the active area in the video and (ii) adjusting the size of the video based on the default position of the at least one UI element is performed individually for each video segment of the plurality of video segments.

2. The method of claim 1, wherein the automatically determining the display area of the video to be presented is based on a default position of the at least one UI element, the at least one UI element configured to be displayed for the portion of the video, and wherein the display area of the video to be presented includes the default position of the at least one UI element in the video.

3. The method of claim 2, further comprising:

determining a central area in the video, the central area having an aspect ratio equal to the aspect ratio of the display screen; and for another portion of the video without the at least one UI element, presenting the central area in the display screen.

4. The method of claim 2, further comprising:

determining the active area in the video, the active area having an aspect ratio equal to the aspect ratio of the display screen; and for another portion of the video without the at least one UI element, presenting the active area in the display screen.

5. The method of claim 4, wherein the active area is determined based on collected user data comprising data of user cursor position within the display screen.

6. The method of claim 1, wherein the at least one UI element is invisible to the user of the video for the portion of the video.

7. The method of claim 1, wherein the automatically determining the display area of the video to be presented is based on the active area in the video, the display area including the active area in the video, the method further comprising:

moving the at least one UI element to the active area for at least the portion of the video.

8. The method of claim 1, wherein the automatically determining the display area of the video to be presented is based on a central area in the video, the display area including the central area in the video, the method further comprising:

moving the at least one UI element to the central area for at least the portion of the video.

9. A system for dynamically adjusting an aspect ratio of a video, the system comprising:

at least one memory for storing computer-executable instructions; and at least one processor for executing the instructions stored on the memory, wherein execution of the instructions programs the at least one processor to perform operations comprising:

receiving (i) a video having an original aspect ratio and at least one user interface (UI) element configured to be selected by a user of the video and (ii) an aspect ratio of a display screen for presenting the video, the at least one UI element having a default position for at least a portion of the video;

automatically determining a display area of the video to be presented based on an active area in the video, the display area including the active area in the video and having an aspect ratio equal to the aspect ratio of the display screen;

determining that the default position of the at least one UI element is outside the display area;

adjusting, in response to a determination that the default position of the at least one UI element is outside of the display area, a size of the video such that the at least one UI element is within the display area; and presenting the display area in the display screen with the at least one UI element for at least the portion of the video, wherein the video comprises a plurality of video segments organized into a video tree having at least two paths and wherein (1) automatically determining the display area of the video to be presented based on the active area in the video and (11) adjusting the size of the video based on the default position of the at least one UI element is performed individually for each video segment of the plurality of video segments.

10. The system of claim 9, wherein the automatically determining the display area of the video to be presented is based on a default position of the at least one UI element, the at least one UI element configured to be displayed for the portion of the video, and wherein the display area of the video to be presented includes the default position of the at least one UI element in the video.

11. The system of claim 10, wherein the operations further comprise:

determining a central area in the video, the central area having an aspect ratio equal to the aspect ratio of the display screen; and for another portion of the video without the at least one UI element, presenting the central area in the display screen.

12. The system of claim 10, wherein the operations further comprise:

determining the active area in the video, the active area having an aspect ratio equal to the aspect ratio of the display screen; and for another portion of the video without the at least one UI element, presenting the active area in the display screen.

13. The system of claim 12, wherein the active area is determined based on collected user data comprising data of user cursor position within the display screen.

14. The system of claim 9, wherein the at least one UI element is invisible to the user of the video for the portion of the video.

15. The system of claim 9, wherein the automatically determining the display area of the video to be presented is based on the active area in the video, the display area including the active area in the video, and wherein the operations further comprise:

moving the at least one UI element to the active area for at least the portion of the video.

16. The system of claim 9, wherein the automatically determining the display area of the video to be presented is based on a central area in the video, the display area including the central area in the video, and wherein the operations further comprise:
  moving the at least one UI element to the central area for at least the portion of the video.

17. An article comprising:
  a non-transitory computer-readable medium having instructions stored thereon that, when executed by one or more computer processors, cause the computer processors to perform operations comprising:
  receiving (i) a video having an original aspect ratio and at least one user interface (UI) element configured to be selected by a user of the video and (ii) an aspect ratio of a display screen for presenting the video, the at least one UI element having a default position for at least a portion of the video;
  automatically determining a display area of the video to be presented based on an active area in the video, the display area including the active area in the video and having an aspect ratio equal to the aspect ratio of the display screen;
  determining that the default position of the at least one UI element is outside the display area;
  adjusting, in response to a determination that the default position of the at least one UI element is outside of the display area, a size of the video such that the at least one UI element is within the display area; and
  presenting the display area in the display screen with the at least one UI element for at least the portion of the video,
  wherein the video comprises a plurality of video segments organized into a video tree having at least two paths and wherein (i) automatically determining the display area of the video to be presented based on the active area in the video and (ii) adjusting the size of the video based on the default position of the at least one UI element is performed individually for each video segment of the plurality of video segments.

18. The method of claim 1, further comprising:
  adding at least one matted area to the video, the matted area equal to a difference between the display area and an area of the reduced-size video.

19. The system of claim 9, wherein the operations further comprise:
  adding at least one matted area to the video, the matted area equal to a difference between the display area and an area of the reduced-size video.

20. The article of claim 17, wherein the operations further comprise:
  adding at least one matted area to the video, the matted area equal to a difference between the display area and an area of the reduced-size video.

* * * * *